Patented Dec. 9, 1941

2,265,465

UNITED STATES PATENT OFFICE 2,265,465

MANUFACTURE OF CHEWING GUM

Robert L. Wilson, Chicago, Ill., assignor to Wm. Wrigley, Jr. Company, Chicago, Ill., a corporation of Delaware No Drawing. Application September 14, 1940, Serial No. 356,829

6 Claims. (Cl. 99—135)

My invention relates to chewing gum and is particularly concerned with improvements in the manufacture thereof and in the character of the resulting products.

Conventional chewing gum is made by combining together, in a suitable mixer, melted chicle or other chewing gum base, commercial liquid corn syrup, and powdered sugar and flavor, with or without supplemental agents which produce desired modifications of texture, chewing characteristics and the like. The plastic chewing gum mass is then passed through rolls and sheeting and scoring machines in accordance with practices well known in the art to produce the usual chewing gum of commerce. Such chewing gum contains, on the average, from about 3% to about 5% moisture. This amount of moisture, which has been found to be necessary in order to impart requisite initial pliability and other characteristics to the finished chewing gum, is usually incorporated through the use of commercial corn syrup, the regularly used grades of which contain from about 13% to about 17% moisture.

Chicle and similar materials and natural gums, used in practically all chewing gum of standard quality, contain normally from about 20% to about 25% moisture. Before being used in the manufacture of chewing gum, however, the chicle or the like is desiccated so that, when incorporated into a chewing gum batch, it contains around 2% moisture. The drying or desiccation of the chicle or like materials causes an oxidative breakdown which manifests itself in a lowering of the quality of the finished chewing gum. The use of dried or desiccated chicle or the like has heretofore been regarded as essential since, if used without drying or, in other words, in its natural or wet state, so far as moisture content is concerned, a chewing gum resulted which underwent "sweating" or exuded moisture in a relatively short time, the chewing gum becoming unsalable.

I have discovered that undesiccated chicle or the like may be employed in the manufacture of chewing gum if there is used therewith a dried or crystalline corn syrup, particularly spray dried corn syrup, having a moisture content of 0% to about 6%, together with the conventionally employed sucrose. The resulting chewing gum contains the normal amount of moisture desired in such products but the chewing gum is notably improved since the oxidative breakdown incident to drying or desiccating the chicle or the like is obviated.

In order that those skilled in the art may even more fully appreciate the character and scope of the invention, I set forth hereinbelow one specific embodiment for carrying out the novel teachings of my invention. It will be understood that this embodiment is illustrative and in no wise limitative of the full scope of my invention. Thus, for example, different base mixtures of gums, guttas, resins and the like may be utilized, with or without supplemental agents, the proportions of the ingredients may be varied somewhat, and other changes may be made within limits without departing from the spirit and teachings of my invention herein.

A chewing gum base is made containing 150 pounds of wet chicle (containing 25% moisture), 110 pounds of "Paloja," 20 pounds of gutta niger, 20 pounds of hydrogenated rosin, and 10 pounds of polymerized rosin oil. There is then mixed therewith 500 pounds of powdered sucrose (XXXX), 191 pounds of anhydrous corn syrup, and 15 pounds of a desired flavor and the resulting product is sheeted and scored or otherwise treated and shaped in accordance with conventional practice.

It will be understood that, if the moisture content of the chicle or the like is, for example, less than 25%, dried or crystalline corn syrup having an appropriate moisture content may be employed instead of the anhydrous corn syrup in order to produce a finished chewing gum having a moisture content of the order of about 3% to about 5%. Thus, by way of illustration, if the moisture content of the chicle or the like is 20%, the dried or crystal line corn syrup used should have a moisture content of the order of about 3.5%. Where the moisture content of a chewing gum base is more than about 25%, for example, in the case of jelutong, gutta soh, gutta siak and the like, it will be understood that such moisture content must be taken into consideration in determining the proper character of dried corn syrup to employ. These latter gums may be blended with rubbers or resins or the like which normally are substantially dry so as to provide a base having the proper moisture content in relation to the dried corn syrup.

The chewing gum base materials which may be employed in the so-called wet form in the practice of my invention may be selected from a large group, representative examples of which are, including those previously mentioned, Mexican chicle, jelutong, gutta soh, gutta siak, amazonis, crown gum, perillo, leche caspi, gutta katiau, and the like, or blends of any two or more thereof, and these may be used together with such substances as gutta percha, balata, ester gum, mastic, kauri, dammar, rubber latex, crepe rubber, resins and resenes such as coumarone-indene resins, vinyl resins, petroleum resins, and the like. The invention is of especial utility in connection with confection products prepared from chicle, jelutong or mixtures thereof, or gutta soh, gutta siak, gutta katiau, and leche caspi alone or in admixture with chicle or jelutong.

For obtaining particular effects on texture, smoothness, cohesiveness and the like, various modifying agents may, if desired, be incorporated in the confection composition, for example, gum arabic, stearine, hydrogenated oils, waxes such as paraffins, beeswax, ceresin wax, carnauba wax, candellila wax, spermaceti, petrolatum, cocoa butter, lanolin, phosphatides such as lecithins or cephalins, and the like.

For special purposes, different sugars or sweetening agents may be utilized, in combination with the chewing gum base and dried or crystalline corn syrup, such as lactose, dextrose, maltose and the like. However, since the usual chewing gum contains sucrose, I particularly prefer to utilize said sugar in combination with the chewing gum base and dried or crystalline corn syrup. I also prefer to utilize the ingredients in substantially the same proportions in which they are present in the ordinary chewing gum. However, the proportions of the various ingredients may vary somewhat without in any way departing from the spirit of my invention.

While I have described my invention in detail, it will be understood that variations and modifications may be made without departing from the spirit thereof, as exemplified by the appended claims.

What I claim as new and desire to protect by Letters Patent of the United States is:

1. In a method of making chewing gum, the step which comprises admixing together minor proportions of dried corn syrup and a wet, undesiccated chewing gum base, and a major proportion of sucrose, the ingredients being so proportioned as to provide a finished chewing gum having a moisture content of about 3% to about 5%.

2. In a method of making chewing gum, the step which comprises admixing together minor proportions of dried corn syrup having from 0% to about 6% moisture and a wet, undesiccated chewing gum base having from about 20% to about 25% moisture, and a major proportion of powdered sucrose, the ingredients being so proportioned as to provide a finished chewing gum having a moisture content of about 3% to about 5%.

3. In a method of making chewing gum, the step which comprises admixing together minor proportions of crystalline corn syrup and wet, undesiccated chicle, and a major proportion of powdered sucrose, the ingredients being so proportioned as to provide a finished chewing gum having a moisture content of about 3% to about 5%.

4. In a method of making chewing gum, the step which comprises admixing together minor proportions of crystalline corn syrup and wet, undesiccated chicle, and a major proportion of powdered sucrose.

5. In a method of making chewing gum, the step which includes incorporating crystalline corn syrup and a wet, undesiccated chewing gum base into the chewing gum batch.

6. In a method of making chewing gum, the step which comprises admixing together minor proportions of spray dried corn syrup and a wet, undesiccated chewing gum base containing not substantially less than 20% moisture, and a major proportion of sucrose, the ingredients being so proportioned as to provide a finished chewing gum having a moisture content of about 3% to about 5%.

ROBERT L. WILSON.